July 26, 1955  J. JOHNSON  2,713,771
VALVE ACTUATING MECHANISM FOR COMBUSTION ENGINES
Original Filed July 21, 1949  2 Sheets-Sheet 1

INVENTOR
John Johnson

ATTORNEY

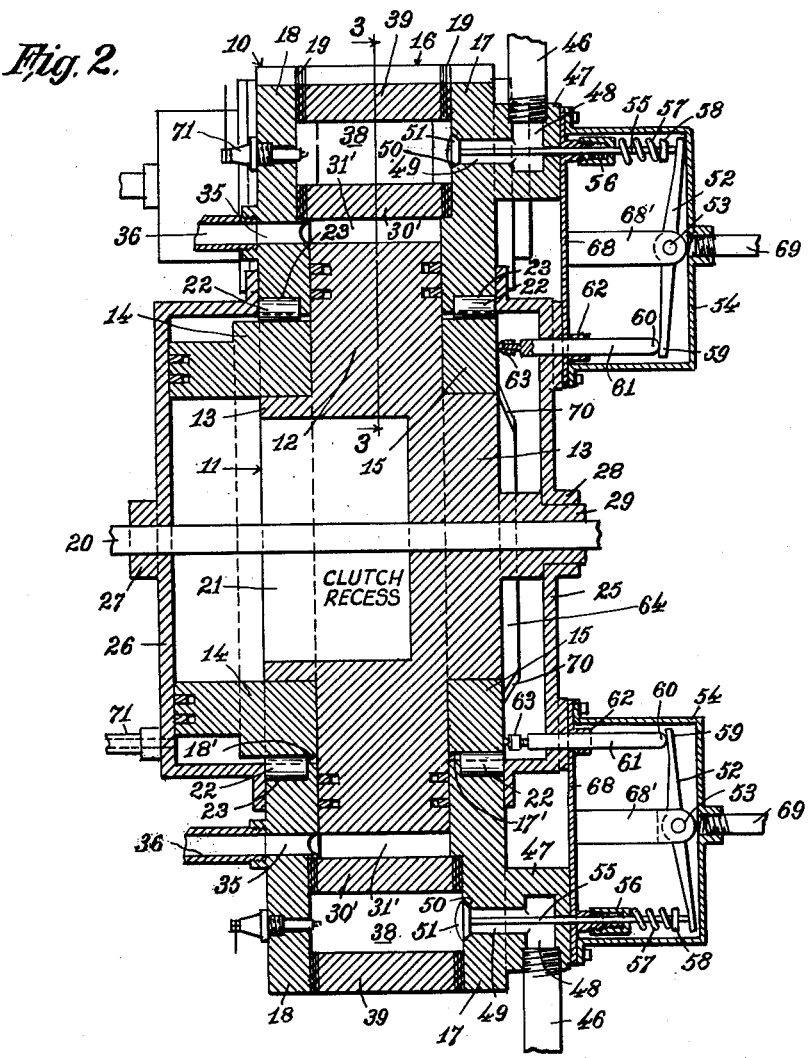
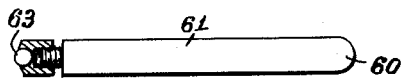

United States Patent Office 2,713,771
Patented July 26, 1955

2,713,771

VALVE ACTUATING MECHANISM FOR COMBUSTION ENGINES

John Johnson, Spokane, Wash.

Original application July 21, 1949, Serial No. 106,028. Divided and this application July 23, 1951, Serial No. 238,075

2 Claims. (Cl. 60—39.61)

This invention relates to a valve actuating mechanism for rotary combustion engines; and the present application is a division of my co-pending application Ser. No. 106,028, filed July 21, 1949.

The engine of which the valve actuating mechanism forming the subject matter of the present application is a part, comprises generally a casing having a pair of oppositely disposed combustion chambers and a pair of expansion chambers communicating with the combustion chambers respectively through valve controlled ports, and a rotor having a pair of radially movable vanes adapted to be extended into said expansion chambers. A fuel inlet duct is provided for each of said combustion chambers, to which fuel under pressure is constantly supplied; and each duct terminates in an inlet port equipped with an inlet valve for controlling said ports. Said valves are actuated simultaneously once upon each revolution of the rotor. To this end each inlet valve is provided with a valve stem extending perpendicularly to the plane of rotation of the rotor, and engaging one end of a lever of the first class, the opposite end of said lever engaging an inwardly extending plunger rod which is actuated by an arcuate cam on the side face of said rotor. A separate cam is provided for each valve, and said cams are of different radii so that each cam will actuate but one valve.

The invention further consists in various details of construction and arrangements of parts as will be described hereinafter and pointed out in the claims.

Figure 1:
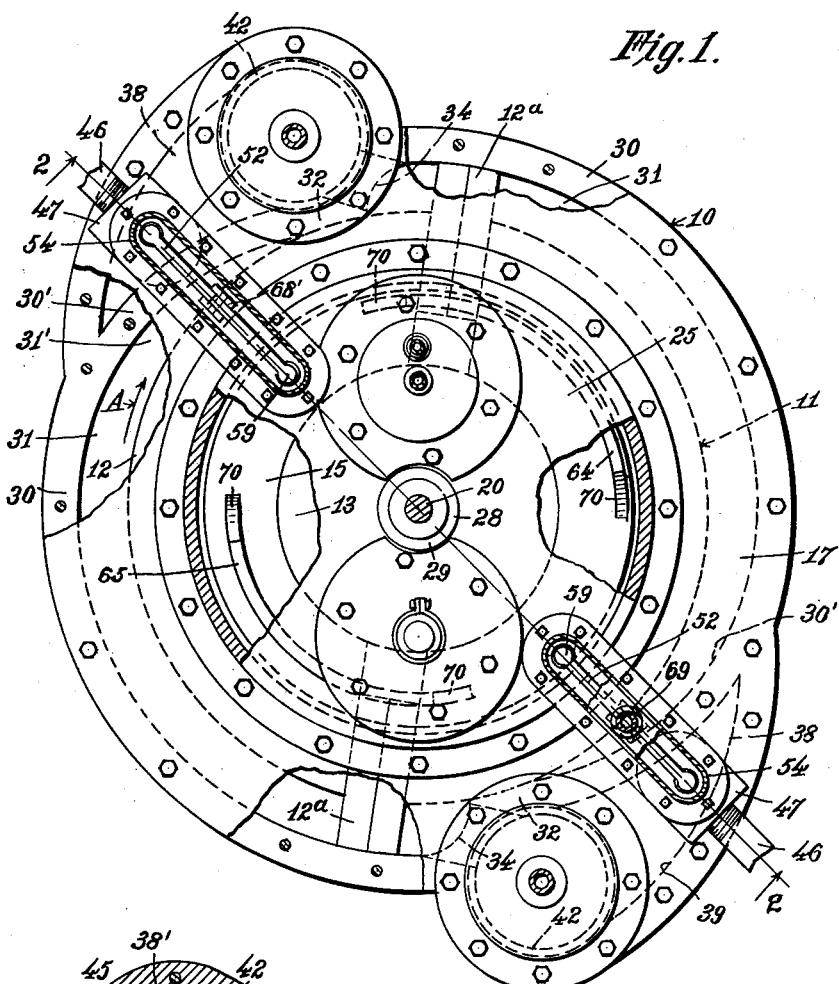
Figure 3:
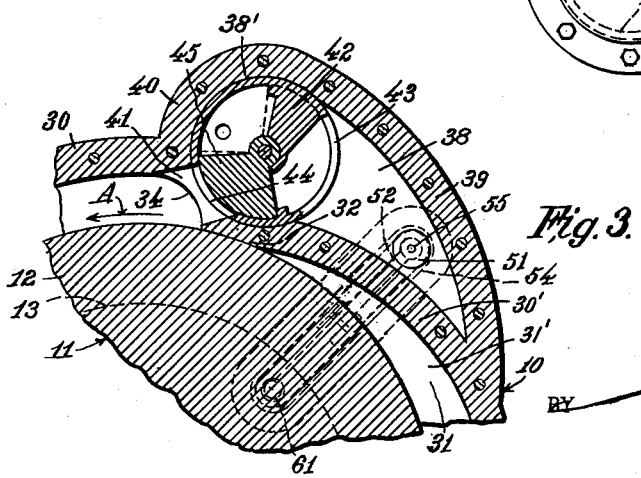

The invention will be more fully understood by reference to the accompanying drawings forming a part of this specification and in which, Fig. 1 is a side elevation of an engine embodying the invention, portions being broken away, Fig. 2 is a transverse section on the line 2—2 of Fig. 1, Fig. 3 is a detail section on substantially the line 3—3 of Fig. 2, and Fig. 4 is a detail view of one of the plunger rods.

Referring to the drawings, 10 indicates generally the fixed casing which constitutes the stator of the engine, and 11 the rotor which comprises a body portion 12, in which are mounted a pair of diametrically opposite, radially slidable vanes 12ª, and a hub 13. A pair of bearing rings 14 and 15 are fixed to the hub and are arranged close against the opposite sides of the body portion 12.

The casing comprises a substantially annular body portion 16 and end plates 17 and 18 upon the inlet and exhaust sides of the engine respectively. These plates lie close against the adjacent portions of the body 11; and shims 19 are provided between the body portion 16 and the end plates 17 and 18 whereby wear between the rotor and housing may be taken up.

The engine shaft 20 extends axially through the casing and rotor, and is operatively connected to the rotor by a clutch arranged within a clutch recess 21 provided in the rotor hub. As the clutch forms no part of the present application the same is not illustrated or described herein.

End plates 17 and 18 are provided with centrally disposed circular openings 17' and 18' respectively, of slightly larger diameter than that of the bearing rings 14 and 15 on the rotor, and into which said bearing rings extend. Interposed between said rings 14 and 15 and the adjacent edges of the end plates which define the openings 17' and 18', are a series of spaced antifriction rollers 22 which are preferably seated in sockets 23 formed in said edges.

End housings 25 and 26 are secured to plates 17 and 18 respectively, closing the openings 17' and 18', and also confining the rollers 22 within their sockets 23. The housing 26 is provided with a bearing 27 for the shaft 20; and the housing 25 has a similar bearing 28 for a lateral extension 29 on the adjacent side of the sub 13.

The body 16 of the casing includes the peripheral wall portion 30 spaced radially from the periphery of the rotor, forming a pair of expansion chambers 31—31 which are separated at the ends thereof by abutments 32 integral with said peripheral wall 30 and arranged diametrically opposite each other. The rotor turns in the direction of the arrow A and the walls 30 at the approach ends of the abutments are gradually curved inwardly as at 30' to ease the vanes over the abutments, and to form gradually contracting exhaust portions 31' for the expansion chambers 31. On the opposite side of the abutments the walls are abruptly curved outwardly as at 34, and merge into the peripheral portions 30. Exhaust ports 35 discharge into exhaust pipes 36.

Radially outward from the exhaust portions 31' of the expansion chambers 31 are combustion chambers 38 formed between the incurved wall portions 30' and outwardly arched wall portions 39, terminating in incurved portions 40 which merge into adjacent wall portions 30. The combustion chambers 38 each communicate with the respective expansion chambers 31 through a valve controlled port 41. As illustrated in Fig. 3 of the drawings, a cylindrical transversely extending valve casing 42 is fitted into the large end 38' of the combustion chamber, and said casing is provided with a port 43 communicating with the combustion chamber 38, and with a port 44 forming a continuation of the port 41 in the abutment 32. A valve 45 controls said port; but as said valve and the operation thereof are fully described in the parent application of which this is a division, and per se are not claimed herein, further description herein is not essential. It is sufficient to understand that the valve is automatically opened by pressure generated by the expanding gases in the combustion chamber immediately after ignition of the fuel therein.

Fuel mixture is supplied, preferably under pressure, to the combustion chambers 38 through pipes 46 connected to bosses 47 which are preferably integral with the end plate 17 and are provided with ducts 48 therein communicating with inlet ports 49 extending through the plate 17 and terminating in valve seats 50. Each inlet port is controlled by a poppet valve 51.

Each valve 51 is actuated by a lever 52 pivoted as at 53 in a narrow housing 54 secured to the boss 47 and to the adjacent portion of the end housing 25 of the engine. The valves 51 are each provided with a valve stem 55 which extends through the respective port 49 into the housing 54 and impinges against the outer end of the lever 52. A packing gland 56 is provided in the housing for the valve stem 55 for a purpose hereinafter described. A spring 57 interposed between said gland and a spring seat 58 on the valve stem tends to maintain the valve in closed position.

The opposite or radially inward end of each lever 52 engages the preferably rounded end 60 of a plunger rod 61 which extends through a sleeve bearing 62 into the end housing 25, and said rod is provided at its inner end with an anti-friction member 63 which is continuously forced by the spring 57 into engagement with the outer face of the ring 15 or one of the arcuate cams 64 or 65 formed on said ring. The anti-friction members 63 are adjustable on the end of the rods 61 to provide means for accurately adjusting the seating of the valves 51.

The bottoms of the housing 54 are sealed by base plates 68, and lubricating oil is supplied to the housings 54 by pipes 69. In practice, the housings 54, as well as the engine end housings 25 and 26 are maintained full of oil, preferably circulated therethrough under slight pressure; and it is for this reason that the glands 56 are provided so as to prevent lubricating oil from being forced into the fuel stream to the combustion chambers. The glands 56, sleeves 62 and supports 63' upon which the levers 52 are pivoted, are all formed on or attached to the base plates 68 of the housings 54. Oil to the engine housings is supplied through an oil pipe 71.

The engine is designed for simultaneous operation of the opposite combustion and expansion chambers once upon each revolution of the rotor, so that the valves 51 must be opened but once, and that at the time, during such period. To this end the cams 64 and 65 are of different radii and the rods 61 are correspondingly spaced from the center of rotation. By this arrangement each cam will operate but one valve upon each revolution. The ends 70 of the cams 64 and 65 are tapered circumferentially to engage under the ends of the rods 61 in opening the valves, and to prevent knocking of the rods against the ring 15 as the valves close.

In the side wall 18, and preferably opposite the valves 51, are spark plugs 71 for igniting the fuel charge in the combustion chambers 38 after the valves have been closed.

It is believed that the construction and operation of the device will be fully understood from the foregoing description.

I claim:

1. In a combustion engine of the class described, a rotor comprising a vaned body and a pair of laterally disposed axial bearing members, in combination with a casing comprising generally an annular wall spaced radially from the periphery of said rotor, a pair of end walls having central circular openings of greater diameter than said bearing members and into which said members extend, and end housings closing said openings, said annular wall having a pair of radially opposite abutments extending inwardly to the periphery of said rotor dividing the intervening space into a pair of expanding chambers, the approach side of said abutments being gradually curved inwardly, combustion chambers formed in said annular wall radially outwardly from said incurved portions, a valved communication between each of said combustion chambers and the end of the adjacent expansion chamber on the opposite side of said abutment from the approach, said casing end walls being extended to close the sides of said combustion chambers, inlet ports in one of said end plates, and communicating with said combustion chambers and terminating in valve seats within said combustion chambers respectively, a boss on said side plate at each of said inlet ports and having a transverse duct communicating with said inlet ports respectively, a pair of radially disposed housings each having a base supported at the outer end on the respective bosses and the inner end supported on the adjacent end housing, a lever of the first class mounted in each of said housings, a valve associated with the respective valve seats, a valve stem extending into said housing and abutting the outer end of said lever, a packing gland for said valve stem, a spring interposed between said stem and said gland for seating said valve, a plunger rod substantially parallel with said valve stem and having one end thereof engaging under the opposite end of the respective lever, said rods extending into said engine casing, and arcuate cams of different radii on the adjacent lateral face of said rotor adapted to engage the opposite plunger rods simultaneously upon each revolution of the motor.

2. In a combustion engine of the class described, a casing comprising a circumferential body portion and a pair of annular end plates, each of said end plates having a central circular opening, and end housings closing said openings, a rotor in said casing comprising a vaned body portion arranged between said end plates with a snug working fit, and bearing rings fixed to said body portion and extending into said circular openings, said circumferential body of said casing being radially spaced outwardly from the periphery of said rotor body and having a pair of diametrically opposit eabutments extending inwardly to the periphery of said rotor and dividing the space between said circumferential body portion of the casing and said rotor into a pair of expansion chambers, the approach side of said abutments being gradually curved inwardly and the opposite side of said abutments curved abruptly outwardly, a combustion chamber formed in said casing radially outwardly from each of said abutments, a valve controlled port in the abruptly curved side of the abutments and communicating with the end of the adjacent expansion chamber, a pair of inlet ports in one of said body end plates communicating with said combustion chambers respectively, a poppet valve controlling each of said ports and each having a valve stem extending outwardly at substantially right angles to said casing, housings mounted outwardly of said casings, a lever of the first class mounted in each of the last said housings with one end thereof engaging one of said valve stems respectively, and a plunger rod parallel with each of said valve stems and having one end thereof engaging under the opposite end of said lever from said valve stem, said plunger rods extending into the adjacent end housing, and arcuate cams of different radii on said bearing rings adapted to simultaneously engage said plunger rods to actuate said valves.

References Cited in the file of this patent

UNITED STATES PATENTS

| | | |
|---|---|---|
| 1,209,204 | Richards | Dec. 19, 1916 |
| 1,411,387 | Suffa | Apr. 4, 1922 |
| 1,659,528 | Hosterman | Feb. 14, 1928 |
| 1,750,502 | Baker | Mar. 11, 1930 |
| 2,172,039 | Shore | Sept. 5, 1939 |
| 2,215,232 | Reed | Sept. 17, 1940 |
| 2,500,458 | Hinckley | Mar. 14, 1950 |